United States Patent
Morita et al.

(10) Patent No.: US 9,055,493 B2
(45) Date of Patent: Jun. 9, 2015

(54) WIRELESS COMMUNICATION SYSTEM, BASE STATION, WIRELESS COMMUNICATION METHOD AND RECORDING MEDIUM

(75) Inventors: Motoki Morita, Tokyo (JP); Kojiro Hamabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 75 days.

(21) Appl. No.: 13/392,382

(22) PCT Filed: Aug. 19, 2010

(86) PCT No.: PCT/JP2010/005121
§ 371 (c)(1),
(2), (4) Date: Feb. 24, 2012

(87) PCT Pub. No.: WO2011/024415
PCT Pub. Date: Mar. 3, 2011

(65) Prior Publication Data
US 2012/0149374 A1 Jun. 14, 2012

(30) Foreign Application Priority Data
Aug. 25, 2009 (JP) .................. 2009-194213

(51) Int. Cl.
*H04W 36/00* (2009.01)
*H04W 36/04* (2009.01)
(Continued)

(52) U.S. Cl.
CPC ............ *H04W 36/04* (2013.01); *H04W 52/244* (2013.01); *H04W 52/40* (2013.01); *H04W 84/045* (2013.01)

(58) Field of Classification Search
CPC ..... H04W 28/08; H04W 48/16; H04W 76/02; H04W 8/12; H04W 36/00; H04W 84/045
USPC ....................................... 455/436
See application file for complete search history.

(56) References Cited

U.S. PATENT DOCUMENTS 5,862,483 A * 1/1999 Fletcher et al. ............. 455/435.2
2004/0180658 A1 * 9/2004 Uchida et al. ................ 455/436
(Continued)

FOREIGN PATENT DOCUMENTS

| | | |
|---|---|---|
| JP | 2006-135673 A | 5/2006 |
| JP | 2008-017325 A | 1/2008 |
| WO | WO 2009/044620 A1 | 4/2009 |

OTHER PUBLICATIONS

"3rd Generation Partnership Project; Technical Specifiation Group Radio Access Network; Envolved Universal Terrestrial Radio Access (E-UTRA) and Evolved universal Terrestrial Radio Access Network (E-UTRAN); Overall description; Stage 2 (Release 8)", 3GPP TS 36.300, Jun. 2007, V8.1.0.

(Continued)

*Primary Examiner* — Timothy Pham
(74) *Attorney, Agent, or Firm* — Sughrue Mion, PLLC (57) ABSTRACT

A wireless communication system (100) includes a plurality of mobile stations (30, 40), a macro base station (10), and a femtocell base station (20) that communicatively connects to a registered mobile station. The femtocell base station (20) includes: a handover execution unit (25) that, when a communication quality of a received signal received from one mobile station which is not a registered mobile station satisfies a predetermined condition and a communication connection to another mobile station is made, hands over the communication connection of another mobile station to the macro base station (10); and a transmission power control unit (26) that, when a received signal is received from one mobile station which is not a registered mobile station and the communication connection to another mobile station is not made, suppresses power of a transmission signal transmitted to the mobile station.

18 Claims, 5 Drawing Sheets

(51) Int. Cl.
*H04W 52/24* (2009.01)
*H04W 52/40* (2009.01)
*H04B 7/00* (2006.01)
*H04W 4/00* (2009.01)
*H04W 84/04* (2009.01)

(56) References Cited

U.S. PATENT DOCUMENTS

| | | | |
|---|---|---|---|
| 2007/0177510 A1* | 8/2007 | Natarajan et al. | 370/238 |
| 2007/0202866 A1* | 8/2007 | Tsuchiya | 455/422.1 |
| 2009/0061873 A1* | 3/2009 | Bao et al. | 455/436 |
| 2009/0318182 A1* | 12/2009 | Nagato et al. | 455/522 |
| 2010/0048212 A1* | 2/2010 | Yavuz et al. | 455/436 |
| 2010/0113035 A1* | 5/2010 | Eskicioglu et al. | 455/444 |
| 2011/0039564 A1* | 2/2011 | Johnstone et al. | 455/436 |
| 2011/0116476 A1* | 5/2011 | Lee et al. | 370/331 |

OTHER PUBLICATIONS

"3rd Generation Partnership Project; Technical Specification Group Radio Access Network; Physical Layer Procedures (FDD) (Release 7)", 3GOO TS 25.214, Dec. 2006, V7.3.0.

"Draft Response LS on Handling of Non-Allowed CSG Cells", 3GOO TSG-RAN WG4 (Radio) Meeting #51bis, R4-092477, Jun. 29-Jul. 2, 2009, Los Angeles, CA.

"Dynamic Setup of HNBs for Engery Savings and Interference Reduction", 3GOO TSG RAN WG3 Meeting #59bis, Mar. 31-Apr. 3, 2008, Shenzhen, China.

"Femtocell and Macrocell Interference Coordination Based on SFR" 3GPP TSG-RAN WG4 #52, R4-093092, Shenzhen, CN, Aug. 24-28, 2009.

"Hybrid HeNB Interference Scenarios and Techniques" 3GPP TSG-RAN WG4 #51-BIS, R4-092498, Jun. 29-Jul. 2, 2009.

"The Draft IEEE 802.16m System Description Document", IEEE 802.16m-08/003r9a, May 31, 2009, pp. 1-182.

* cited by examiner

WIRELESS COMMUNICATION SYSTEM, BASE STATION, WIRELESS COMMUNICATION METHOD AND RECORDING MEDIUM

CROSS REFERENCE TO RELATED APPLICATIONS

This application is a National Stage of International Application No. PCT/JP2010/005121 filed on Aug. 19, 2010, which claims priority from Japanese Patent Application No. 2009-194213, filed on Aug. 25, 2009, the contents of all of which are incorporated herein by reference in their entirety.

TECHNICAL FIELD

The present invention relates to a wireless communication system, a base station, a wireless communication method and a recording medium having a program stored thereon.

BACKGROUND ART

In recent years, the popularization of cellular phones has increased demand for voice communication or data communication through cellular phones from indoors as well as outdoors. With such an increase in demand, the development of microminiature base stations capable of being installed indoors such as users' premises or small offices has progressed. The coverage of such a base station is extremely small compared to the coverage of a base station installed outdoors (hereinafter, referred to as a macro base station), and thus is referred to as a femtocell. Hereinafter, the microminiature base station is referred to as a femtocell base station. As an operation form of the femtocell base station, it has been investigated that only a mobile station which has been previously registered is connected to the femtocell base station and performs communication therewith.

Figure 5:
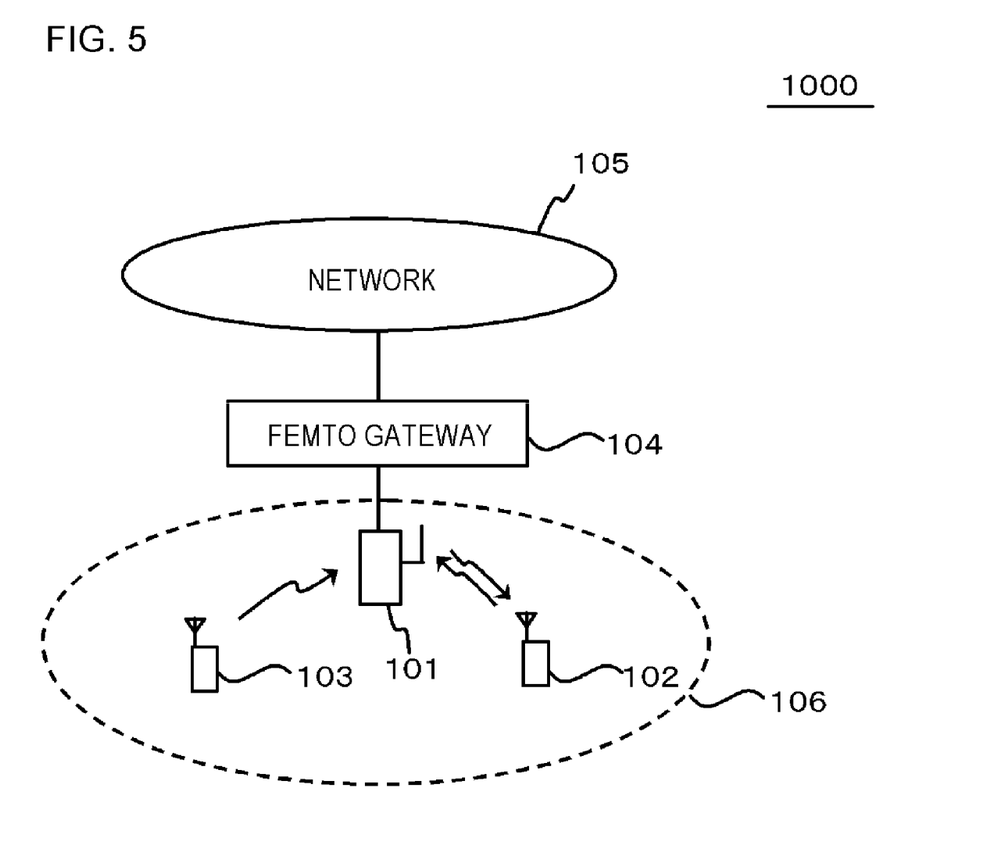
FIG. 5 is a configuration diagram of the wireless communication system including the femtocell base station.

FIG. 5 is a configuration diagram of a wireless communication system 1000 including a femtocell base station 101. The reference numeral 101 denotes a femtocell base station, and forms a femtocell 106. The femtocell base station 101 is connected to a network 105 through a femto gateway (GW) 104. The reference numerals 102 and 103 denote a mobile station. When the mobile stations exist in the femtocell 106, the registered mobile station 102 registered with the femtocell base station 101 can be connected to the network 105 through the femtocell base station 101. The unregistered mobile station 103 which is not registered with the femtocell base station 101 cannot be connected to the network 105 through the femtocell base station 101.

The above-mentioned wireless communication system 1000 transmits a pilot signal toward the femtocell 106 within the range covered. The registered mobile station 102 performs synchronization establishment, channel estimation and the like by receiving the pilot signal, and transmits and receives data to and from the femtocell base station 101. For this reason, the pilot signal can be received in the registered mobile station 102 with good quality, thereby allowing good communication quality to be provided.

In addition, as a technique capable of being applied to the above-mentioned wireless communication system 1000, the following technique is proposed.

In a wireless communication system disclosed in Patent Document 1 (Japanese Unexamined Patent Publication No. 2008-17325), when a wireless device interfering with the communication with a wireless base station is detected, a wireless terminal device (mobile station) belonging to the wireless base station transmits a control signal to the wireless device. Thereby, it is possible to control the wireless base station even when it is a wireless device of an interference source which is not capable of being identified, and to avoid a radio wave interference.

Base stations included in a wireless communication system (mobile communication system) disclosed in Patent Document 2 (Japanese Unexamined Patent Publication No. 2006-135673) control transmission power of a pilot channel based on the total transmission power or the upstream interference amount in a peripheral base station. Thereby, the transmission power of the pilot channel is autonomously set while performing an emphasis between the base stations, and thus the cell formation is possible.

In Non-patent Document 1, a system is proposed in which when a specific signal for an operation is received from the mobile station, a femtocell base station operates. It is examined that the femtocell base station is used in systems such as wideband code division multiple access (W-CDMA), evolved universal terrestrial radio access (E-UTRA), and long term evolution (LTE) in the wireless communication standard of the cellular phone, and is used in systems such as IEEE 802.16m in the wireless communication standard of wireless metropolitan area network (wireless MAN).

When the femtocell base station is used in W-CDMA, as disclosed in Non-patent Document 2, data transmission using an individual channel in the uplink and the downlink of which transmission power is controlled or data transmission using a shared channel in the downlink is performed.

When the femtocell base station is used in E-UTRA, as disclosed in Non-patent Document 3, data transmission is performed in which the band of the wireless frequency is divided into a plurality of resource blocks (PRB; Physical Resource Block), a scheduler included in a base station performs allocation of the PRBs, and the allocated PRBs are used.

When the femtocell base station is used in IEEE 802.16m, as disclosed in Non-patent Document 4, data transmission is performed in which orthogonal frequency division multiple access (OFDMA) is adopted as a communication standard to divide the band of the wireless frequency into subcarriers, a scheduler included in a base station performs allocation of the subcarriers, and the allocated subcarriers are used.

RELATED DOCUMENT

Patent Document

[Patent Document 1] Japanese Unexamined Patent Publication No. 2008-17325
[Patent Document 2] Japanese Unexamined Patent Publication No. 2006-135673

Non-Patent Document

[Non-patent Document 1] "Dynamic Setup of HNBs for Energy Savings and Interference Reduction", 3GPP TSG RAN WG3 Meeting #59bis, R3-080658
[Non-patent Document 2] "3rd Generation Partnership Project; Technical Specification Group Radio Access Network; Physical layer procedures (FDD) (Release 7)", 3GPP TS 25.214 V7.3.0 (2006-12), pp. 14-31
[Non-patent Document 3] "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.1.0 (2007-06), pp. 16-30
[Non-patent Document 4] "IEEE 802.16m System Description Document", IEEE 802.16m-08/003r9a, pp. 64-88

DISCLOSURE OF THE INVENTION

However, when the above-mentioned technique is applied to the wireless communication system 1000 of FIG. 5, there is room for improvement in the following respect. That is, when the femtocell base station 101 and the registered mobile station 102 communicate with each other and the unregistered mobile station 103 gets close to the femtocell 106, interference is generated between the registered mobile station 102 and the unregistered mobile station 103, and thus the mutual communication quality is deteriorated. At this time, when the communication of the unregistered mobile station 103 is controlled so as to avoid the interference, there may be a concern that the communication quality of the unregistered mobile station 103 cannot be maintained. In addition, when the transmission power of the pilot signal of the femtocell base station 101 is turned down (or stopped), there may be a concern that the communication quality of the registered mobile station 102 cannot be maintained.

The present invention is contrived in view of such circumstances, and an object thereof is to provide a wireless communication system, a base station, a wireless communication method and a recording medium having a program stored thereon, which are capable of avoiding interference from an unregistered mobile station and also maintaining the communication quality of the unregistered mobile station, in the communication of a base station capable of being communicatively connected to a registered mobile station and the mobile station with each other.

According to the invention, there is provided a wireless communication system including: a plurality of mobile stations; a first base station capable of being communicatively connected to the plurality of mobile stations; and a second base station capable of being communicatively connected to a registered mobile station previously registered out of the plurality of mobile stations, wherein the second base station includes a registered mobile station storage unit that stores the registered mobile station, a mobile station information acquisition unit that acquires mobile station information, specifying one mobile station, from a received signal received from the one mobile station of the plurality of mobile stations, a communication connection unit that communicatively connects to the one mobile station, when the one mobile station specified by the mobile station information acquired through the mobile station information acquisition unit is the registered mobile station, a communication quality acquisition unit that acquires a communication quality of at least one of a received signal received from the one mobile station and a received signal received from another mobile station, when the one mobile station specified by the mobile station information acquired through the mobile station information acquisition unit is not the registered mobile station, a handover execution unit that hands over a communication connection of the another mobile station to the first base station, when the communication quality acquired through the communication quality acquisition unit satisfies a predetermined condition, and the communication connection unit is communicatively connected to the another mobile station other than the one mobile station, and a transmission power control unit that suppresses power of a transmission signal transmitted to the mobile station, when the one mobile station specified by the mobile station information acquired through the mobile station information acquisition unit is not the registered mobile station, and the communication connection unit is not communicatively connected to the another mobile station.

In addition, according to the invention, there is provided a base station including: a registered mobile station storage unit that stores a registered mobile station capable of performing a communication connection out of a plurality of mobile stations; a mobile station information acquisition unit that acquires mobile station information, specifying one mobile station, from a received signal received from the one mobile station of the plurality of mobile stations; a communication connection unit that communicatively connects to the one mobile station, when the one mobile station specified by the mobile station information acquired through the mobile station information acquisition unit is the registered mobile station; a communication quality acquisition unit that acquires a communication quality of at least one of a received signal received from the one mobile station and a received signal received from another mobile station, when the one mobile station specified by the mobile station information acquired through the mobile station information acquisition unit is not the registered mobile station; a handover execution unit that hands over a communication connection of the another mobile station to another base station different from its own base station, when the communication quality acquired through the communication quality acquisition unit satisfies a predetermined condition, and the communication connection unit is communicatively connected to the another mobile station other than the one mobile station; and a transmission power control unit that suppresses power of a transmission signal transmitted to the mobile station, when the one mobile station specified by the mobile station information acquired through the mobile station information acquisition unit is not the registered mobile station, and the communication connection unit is not communicatively connected to the another mobile station.

Further, according to the invention, there is provided a wireless communication method including: a mobile station information acquisition step of acquiring mobile station information, identifying one mobile station, from a received signal received from the one mobile station of a plurality of mobile stations; a communication connection step of performing a communication connection to the one mobile station, when the one mobile station specified by the mobile station information acquired in the mobile station information acquisition step is a registered mobile station previously registered; a first communication quality acquisition step of acquiring a communication quality of at least one of a received signal received from the one mobile station and a received signal received from another mobile station, when the one mobile station specified by the mobile station information acquired in the mobile station information acquisition step is not the registered mobile station; a handover execution step of handing over a communication connection of the another mobile station, when the communication quality acquired in the first communication quality acquisition step satisfies a predetermined condition, and a communication connection to the another mobile station other than the one mobile station is made; and a transmission power suppression step of suppressing power of a transmission signal transmitted to the mobile station, when the one mobile station specified by the mobile station information acquired in the mobile station information acquisition step is not the registered mobile station, and the communication connection to the another mobile station is not made.

Further, according to the invention, there is provided a computer readable recording medium having a program stored thereon, the program causing a computer to execute data processing, wherein the data processing includes: a mobile station information acquisition process of acquiring mobile station information, identifying one mobile station, from a received signal received from the one mobile station of a plurality of mobile stations; a communication connection process of performing a communication connection to the one mobile station, when the one mobile station specified by the mobile station information acquired in the mobile station information acquisition process is a registered mobile station previously registered; a first communication quality acquisition process of acquiring a communication quality of at least one of a received signal received from the one mobile station and a received signal received from another mobile station, when the one mobile station specified by the mobile station information acquired in the mobile station information acquisition process is not the registered mobile station; a handover execution process of handing over a communication connection of the another mobile station, when the communication quality acquired in the first communication quality acquisition process satisfies a predetermined condition, and a communication connection to the another mobile station other than the one mobile station is made; and a transmission power suppression process of suppressing power of a transmission signal transmitted to the mobile station, when the one mobile station specified by the mobile station information acquired in the mobile station information acquisition process is not the registered mobile station, and the communication connection to the another mobile station is not made.

According to the invention, there are provided a wireless communication system, a base station, a wireless communication method and a recording medium having a program stored thereon, which are capable of avoiding interference from an unregistered mobile station and also maintaining the communication quality of the unregistered mobile station, in the communication of a base station capable of being communicatively connected to a registered mobile station and the mobile station.

BRIEF DESCRIPTION OF THE DRAWINGS

The above-mentioned objects, other objects, features and advantages will be made clearer from the preferred embodiment described below, and the following accompanying drawings.

DESCRIPTION OF EMBODIMENTS

Hereinafter, the embodiment of the invention will be described with reference to the accompanying drawings. In all the drawings, like elements are referenced by like reference numerals and signs and descriptions thereof will not be repeated.

Figure 1:
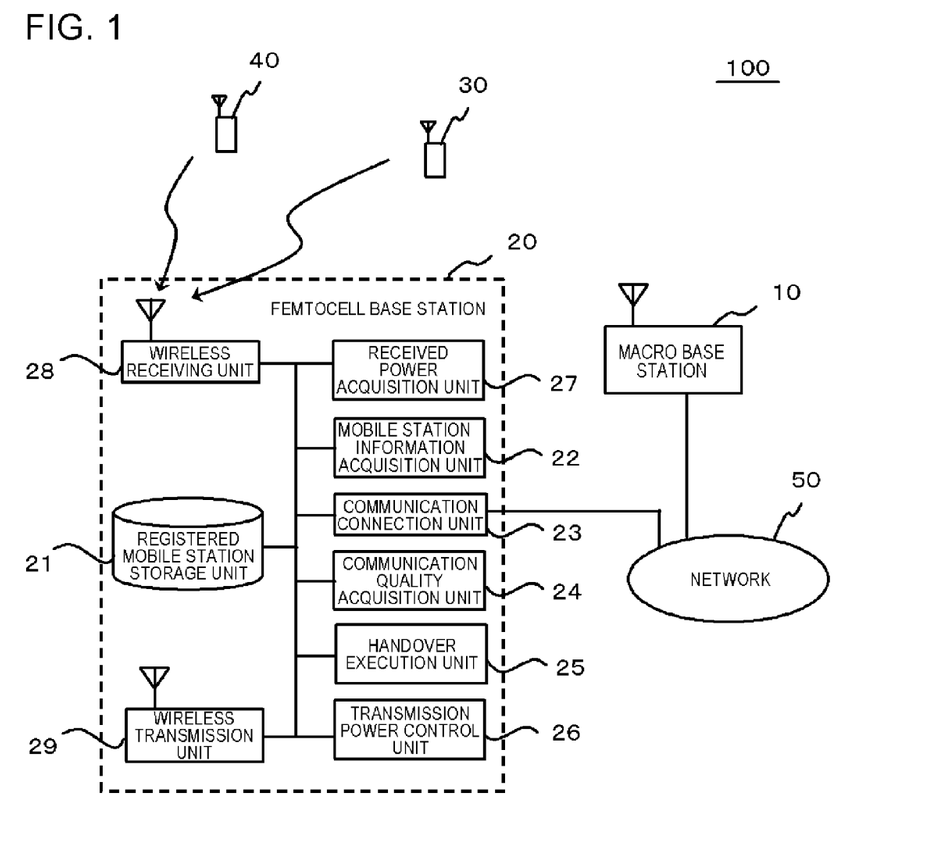
FIG. 1 is a configuration diagram of a wireless communication system according to an embodiment of the invention.

FIG. 1 is a configuration diagram of a wireless communication system 100 according to an embodiment of the invention. The wireless communication system 100 includes a mobile station 30, a mobile station 40, a macro base station 10 capable of being communicatively connected to the mobile station 30 and the mobile station 40, a femtocell base station 20 capable of being communicatively connected to a registered mobile station previously registered out of the mobile station 30 and the mobile station 40, and a network 50. In the embodiment, the mobile station 30 is a registered mobile station, and the mobile station 40 is an unregistered mobile station. That is, the mobile station 30 can communicate with the network 50 through the macro base station 10 or the femtocell base station 20, and the mobile station 40 can communicate with the network 50 only through the macro base station 10. At the point of time shown in FIG. 1, the mobile station 30 transmits an uplink signal to the femtocell base station 20. The mobile station 40 is an unregistered mobile station, and thus does not transmit the uplink signal intentionally toward the femtocell base station 20. However, the femtocell base station 20 receives the uplink signal transmitted from the mobile station 40 toward the macro base station 10 as an interference.

In the embodiment, the network 50 is the Internet, a LAN, a public telephone network, or a combination thereof. In addition, the mobile station 30 or the mobile station 40 is a device capable of being communicatively connected to the network 50, for example, a mobile communication device, a cellular phone, a PHS and the like.

Meanwhile, in FIG. 1, the macro base station 10 or the femtocell base station 20 is shown so as to be connected directly to the network 50, but may be connected thereto through the intervention of a gateway unit or a radio network controller (RNC) and the like.

The femtocell base station 20 is constituted by a registered mobile station storage unit 21, a mobile station information acquisition unit 22, a communication connection unit 23, a communication quality acquisition unit 24, a handover execution unit 25, a transmission power control unit 26, a received power acquisition unit 27, a wireless receiving unit 28, and a wireless transmission unit 29.

The wireless receiving unit 28 includes a receiving antenna, and receives an uplink signal from the mobile stations 30 and 40, or a downlink signal or a common pilot signal from the macro base station 10, and the like, through the receiving antenna. The wireless receiving unit 28 is a receiving unit of each wireless type such as W-CDMA, E-UTRA, or IEEE 802.16m, and the details of the configuration will be omitted.

The wireless transmission unit 29 includes a transmitting antenna, and transmits the downlink signal, the common pilot signal and the like to the mobile station 30, which is a registered mobile station, through the transmitting antenna. The wireless transmission unit 29 is a transmission unit of each wireless type such as W-CDMA, E-UTRA, or IEEE 802.16m, and the details of the configuration will be omitted.

The registered mobile station storage unit 21 stores a registered mobile station (mobile station 30 in the embodiment) capable of performing the communication connection out of the mobile station 30 and the mobile station 40. More specifically, the registered mobile station storage unit 21 stores identification information capable of identifying each of the registered mobile stations. This identification information can preferably identify the registered mobile stations individually.

The mobile station information acquisition unit 22 acquires mobile station information, which specifies a mobile station transmitting a received signal received from the mobile station 30 or the mobile station 40, from the received signal.

When a mobile station specified by the mobile station information acquired through the mobile station information acquisition unit 22 is the mobile station 30, the mobile station 30 is a registered mobile station, whereby the communication connection unit 23 is communicatively connected to the mobile station 30, and thus is communicatively connected to the network 50. In addition, when a mobile station specified by the mobile station information acquired through the mobile station information acquisition unit 22 is the mobile station 40, the mobile station 40 is an unregistered mobile station, whereby the communication connection unit 23 cannot be communicatively connected to the mobile station 40.

The communication quality acquisition unit 24 acquires received power as the communication quality of the received uplink signal. For example, when a mobile station specified by the mobile station information acquired through the mobile station information acquisition unit 22 is the mobile station 40 (when it is not a registered mobile station), the communication quality acquisition unit 24 acquires received power (communication quality) of the uplink signal (received signal) received from the mobile station 40. The communication quality acquisition unit 24 may acquire received power by measuring the received power of the received uplink signal, and may acquire information indicative of the received power from received data contained in the received uplink signal.

Meanwhile, the communication quality in the embodiment is set to the received power of the uplink signal received from the mobile station 40 (unregistered mobile station), but may not be limited thereto. For example, the communication quality acquired by the communication quality acquisition unit 24 is not limited as long as it is a status varying with the level of the interference depending on the mobile station 40 such as the radio field intensity of the uplink signal received from the mobile station 40.

When the received power acquired by the communication quality acquisition unit 24 exceeds the threshold $A_1$ (when the communication quality satisfies a predetermined condition) and the communication connection unit 23 is communicatively connected to another mobile station, for example, the mobile station 30, the handover execution unit 25 hands over the communication connection of the mobile station 30 to the macro base station 10 (another base station different from its own base station).

Figure 2:
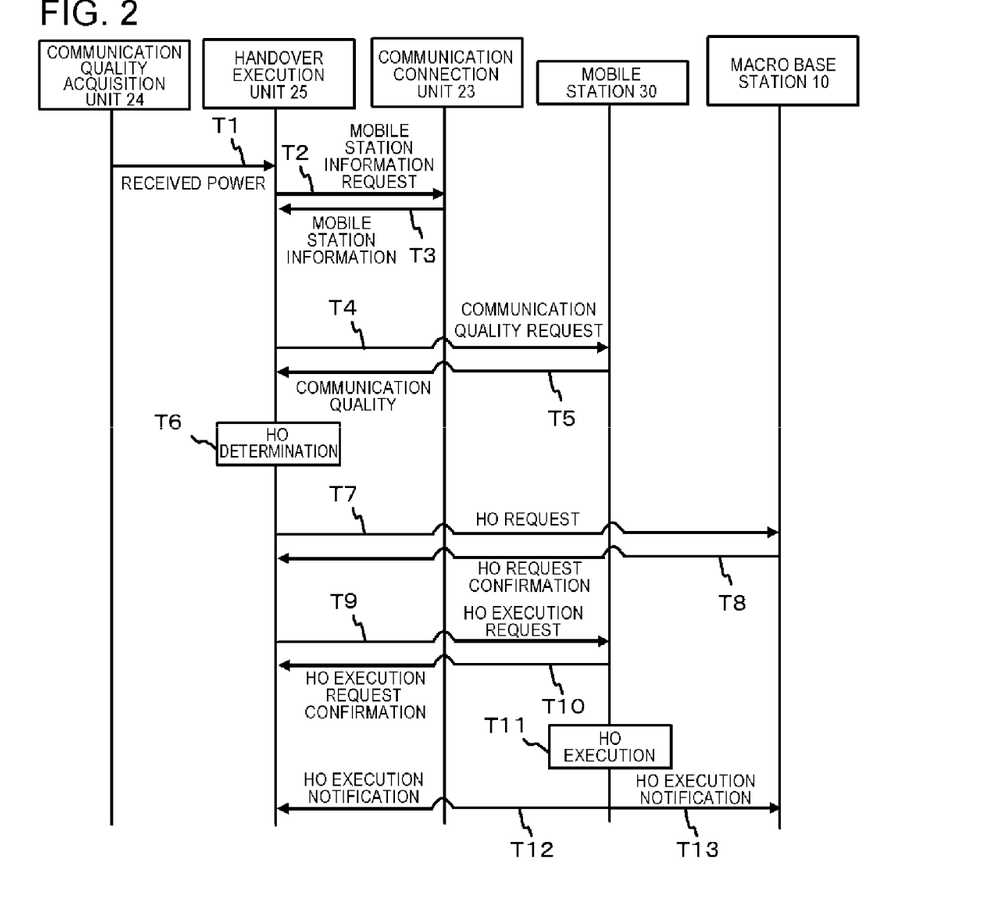
FIG. 2 is a sequence diagram when communication connection of a mobile station is handed over from a femtocell base station to a macro base station.

FIG. 2 is a sequence diagram when the communication connection of the mobile station 30 is handed over from the femtocell base station 20 to the macro base station 10. However, the processing procedure shown in FIG. 2 is an example for realizing the handover in the invention, and may not be limited thereto.

First, when the communication quality acquisition unit 24 acquires received power exceeding the threshold $A_1$, it notifies the handover execution unit 25 of that effect (step T1). Next, the handover execution unit 25 accepts the notification from the communication quality acquisition unit 24, and requests mobile station information of a mobile station which is currently communicatively connected to the communication connection unit 23 (step T2). Subsequently, the communication connection unit 23 outputs the mobile station information of the mobile station 30, which is a mobile station in communication connection, to the handover execution unit 25 at the request of step T2 (step T3). The handover execution unit 25 requests the communication quality of a downlink signal of the base station (herein, the macro base station 10) other than the femtocell base station 20 out of downlink signals currently being received by the mobile station 30, from the mobile station 30 indicated by the mobile station information which is output in step T3 (step T4). The mobile station 30 outputs the communication quality of the downlink signal being received at the request of step T4 (step T5). The handover execution unit 25 determines a base station capable of handing over the communication connection of the mobile station 30, from the communication quality which is output in step T5 (step T6). In the determination of the base station capable of performing the handover, for example, a base station in which the receiving is performed with the maximum received power of the received power of the downlink signal of the base station other than the femtocell base station 20 may be determined to be a base station capable of performing the handover. If it is determined to perform the handover to the macro base station 10 in step T6, the handover execution unit 25 requests the handover from the macro base station 10 (step T7), and accepts the confirmation thereof from the macro base station 10 (step T8). In addition, the handover execution unit 25 requests the mobile station 30 to execute the handover (step T9), and accepts the confirmation thereof from the mobile station 30 (step T10). The mobile station 30 executes the handover from the femtocell base station 20 to the macro base station 10 (step T11), and notifies the femtocell base station 20 (handover execution unit 25) and the macro base station 10 of that effect when the handover is completed (steps T12 and T13).

Meanwhile, in the communication quality requested in step T4, standards used in a wireless standard (SIR: Signal to Interference Ratio, SINR: Signal to Interference and Noise Ratio, CIR: Carrier to Interference Ratio, Eb/No: Energy per bit over Noise, and the like) may be used.

The transmission power control unit 26 sets the magnitude of the power of the transmission signal transmitted from the wireless transmission unit 29 to the mobile station. Here, the transmission signal transmitted to the mobile station is a common pilot signal or a downlink signal. Meanwhile, in the femtocell base station 20 of the embodiment, two kinds of operating states of an active state and a sleep state are determined depending on the magnitude of the power of the transmission signal transmitted from the wireless transmission unit 29. The transmission power control unit 26 changes a setting value of the power corresponding to the active state and a setting value of the power corresponding to the sleep state. Meanwhile, the setting value of the power corresponding to the active state is larger than the setting value of the power corresponding to the sleep state. In addition, the setting value of the power corresponding to the sleep state may be zero.

When the mobile station specified by the mobile station information acquired through the mobile station information acquisition unit 22 is the mobile station 40 (which is not a registered mobile station) and the communication connection unit 23 is communicatively connected to another mobile station, the transmission power control unit 26 sets the setting value of the power corresponding to the sleep state, and suppresses the power of the transmission signal transmitted to the mobile station.

In the embodiment, the transmission power control unit 26 detects that the communication connection with the mobile station 30 communicatively connected by the communication connection unit 23 is entirely disconnected, and then suppresses the power of the transmission signal transmitted to the mobile station. Meanwhile, the transmission power control unit 26 may detect the disconnection of the communication connection by accepting the notification which is output from the communication connection unit 23, may detect the disconnection of the communication connection by monitoring the communication connection unit 23, may detect the disconnection of the communication connection by accepting the notification that the handover execution unit 25 completes the handover from the mobile station in communication, and may detect the disconnection of the communication connection by a method using a combination thereof.

In addition, when the power of the transmission signal is suppressed by the transmission power control unit 26, that is, the femtocell base station 20 is in the sleep state, and when the received power from the mobile station 40 (mobile station which is not a registered mobile station) acquired by the communication quality acquisition unit 24 is the threshold $A_2$ or less, the transmission power control unit 26 releases suppression of the power for the transmission signal, and sets a setting value of the power corresponding to the active state. Meanwhile, the threshold $A_2$ is preferably smaller than the threshold $A_1$.

The received power acquisition unit 27 acquires the received power of the received signal received from the macro base station 10. The transmission power control unit 26 makes the threshold $A_1$ smaller as the received power acquired by the received power acquisition unit 27 becomes larger, and makes the threshold $A_1$ larger as the acquired received power becomes smaller. In addition, the transmission power control unit 26 may make the threshold $A_2$ larger as the threshold $A_1$ is made larger, and may make the threshold $A_2$ smaller as the threshold $A_1$ is made smaller. Here, the received signal received from the macro base station 10 is, for example, a downlink signal, a common pilot signal or the like transmitted by the macro base station 10. In addition, the correlation between the received power from the macro base station 10 and the threshold $A_1$ may be in an inverse relationship, and may be in a stepwise shape (in this case, the threshold $A_1$ having a constant amount is increased in which the received power from the macro base station 10 becomes a predetermined value or less, and this relationship is continued hereinafter).

All or a portion of the configuration contained in the femtocell base station 20 may be realized by hardware, or may be realized by a program (or program code) that causes a processor to execute processing. The processor reads out and executes the program from a recording medium such as a nonvolatile memory.

When the configuration contained in the femtocell base station 20 is executed by a program, the program is stored in a processor (computer) readable recording medium. The program causes the processor to execute a mobile station information acquisition process of acquiring mobile station information that identifies one mobile station from the received signal received from one mobile station of the mobile station 30 and the mobile station 40. In addition, when one mobile station specified by the mobile station information acquired through the mobile station information acquisition process is a registered mobile station previously registered, the program causes the processor to execute a communication connection process of performing the communication connection to the one mobile station. When the one mobile station specified by the mobile station information acquired through the mobile station information acquisition process is not a registered mobile station and the communication connection to another mobile station other than the one mobile station is made, the program causes the processor to execute a communication quality acquisition process of acquiring the communication quality of at least one of a received signal received from one mobile station or a received signal received from another mobile station. When the communication quality acquired through the first communication quality acquisition process satisfies a predetermined condition, the program causes the processor to execute a handover execution process of handing over the communication connection of another mobile station. When the one mobile station specified by the mobile station information acquired through the mobile station information acquisition process is not a registered mobile station and the communication connection to the another mobile station is not made, the program causes the processor to execute a transmission power suppression process of suppressing the power of the transmission signal transmitted to the mobile station.

Figure 3:
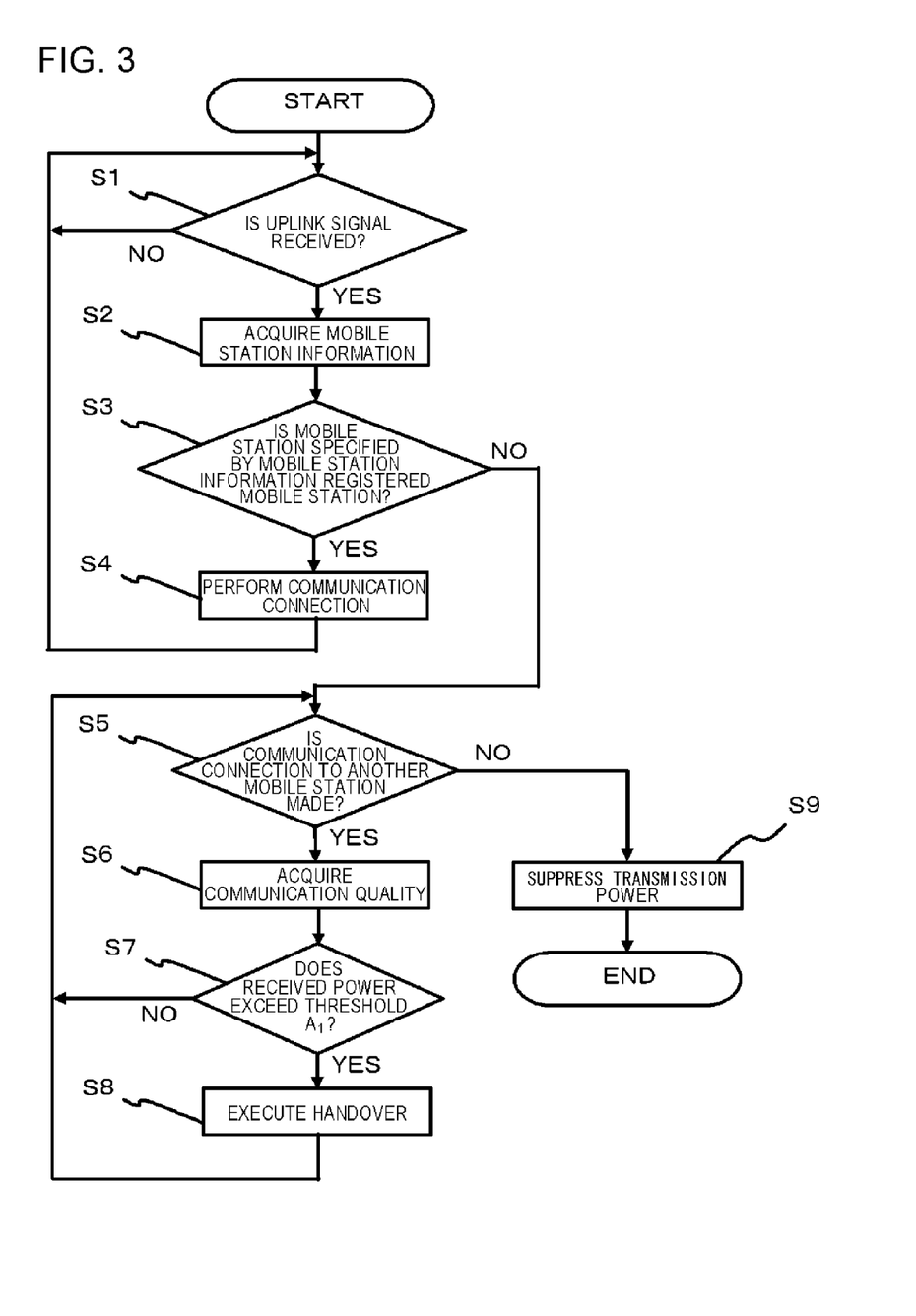
FIG. 3 is a flow diagram illustrating a wireless communication method applied to the femtocell base station in an active state.

FIG. 3 is a flow diagram illustrating a wireless communication method applied to the femtocell base station 20 in an active state. First, while an uplink signal is not received from any of the mobile station 30 and the mobile station 40 (NO of step S1), the femtocell base station 20 stands by until the uplink signal is received. When the uplink signal is received from one mobile station of the mobile station 30 and the mobile station 40 (YES of step S1), the femtocell base station 20 acquires mobile station information that identifies one mobile station from the received uplink signal (step S2).

When one mobile station specified by the mobile station information acquired in step S2 is the mobile station 30 (registered mobile station previously registered) (YES of step S3), the femtocell base station 20 is communicatively connected to the mobile station 30 (step S4).

In addition, when the one mobile station specified by the mobile station information acquired in step S2 is the mobile station 40 (which is not a registered mobile station) (NO of step S3) and the communication connection to another mobile station other than the one mobile station is made (YES of step S5), the femtocell base station 20 acquires the received power (communication quality) of the uplink signal received from the mobile station 40 (step S6). When the received power acquired in step S6 exceeds the threshold $A_1$ (when the communication quality satisfies a predetermined condition) (YES of step S7), the communication connection of another mobile station is handed over (step S8), and the process returns to the determination of step S5 again. In addition, when the received power acquired in step S6 does not exceed the threshold $A_1$ (when the communication quality does not satisfy a predetermined condition) (NO of step S7), the process returns to the determination of step S5 again. The processes of step S5 to step S8 are repeated until the mobile station to which the femtocell base station 20 (communication connection unit 23) is communicatively connected is no longer in communication.

In addition, when one mobile station specified by the mobile station information acquired in step S2 is the mobile station 40 (which is not a registered mobile station) (NO of step S3) and the communication connection to another mobile station is not made (NO of step S5), the femtocell base station 20 suppresses the power of the transmission signal transmitted to the mobile station (step S9), and the femtocell base station 20 is in the sleep state, whereby the flow diagram is terminated.

Figure 4:
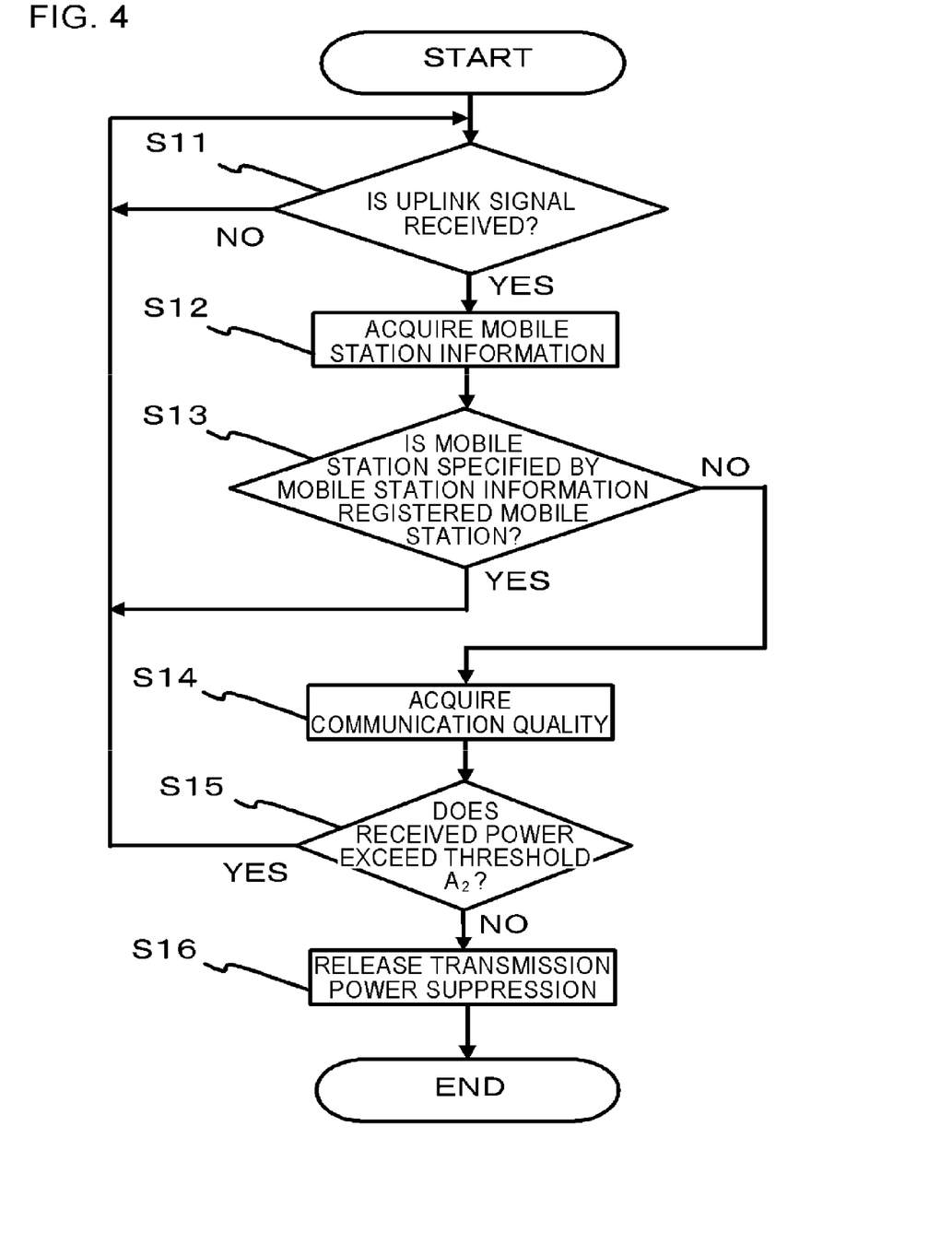
FIG. 4 is a flow diagram illustrating the wireless communication method applied to the femtocell base station in a sleep state.

FIG. 4 is a flow diagram illustrating the wireless communication method applied to the femtocell base station 20 in a sleep state. While the uplink signal is not received (NO of step S11) in a state where the power of the transmission signal is suppressed in step S9 of FIG. 3, the femtocell base station 20 repeats a standby state, and when the uplink signal is received from one mobile station of the mobile station 30 and the mobile station 40 (YES of step S11), the femtocell base station acquires mobile station information that identifies one mobile station from the received uplink signal (step S12).

When one mobile station specified by the mobile station information acquired in step S12 is the mobile station 40 (which is not a registered mobile station) (NO of step S13), the femtocell base station 20 acquires received power of the uplink signal received from the mobile station 40 (step S14). Meanwhile, when the one mobile station specified by the mobile station information acquired in step S12 is the mobile station 30 (which is a registered mobile station) (YES of step S13), the process in the femtocell base station 20 returns to step S11 again.

When the received power acquired in step S14 exceeds the threshold $A_2$ (YES of step S15), the process returns to step S11 again. In addition, when the received power acquired in step S14 is the threshold $A_2$ or less (NO of step S15), the suppression of the power for the transmission signal set in step S9 is released (step S16), and the femtocell base station 20 is in an active state, whereby the flow diagram is terminated.

Meanwhile, the femtocell base station 20 acquires received power of the received signal received from the macro base station 10 as a proves independent of the flow diagrams of FIGS. 3 and 4, and the threshold $A_1$ is made smaller as the acquired received power becomes larger. Meanwhile, the femtocell base station 20 receives the received signal intermittently from the macro base station 10, and the interval thereof may or may not be constant.

The effect of the embodiment will be described. When the received signal is received from the unregistered mobile station 40 during the communication with the registered mobile station 30, and the communication quality of the received signal satisfies a predetermined condition, the femtocell base station 20 of the embodiment hands over the communication connection of the mobile station 30 in communication to the macro base station 10, and suppresses its own transmission power when the mobile station in communication connection is no longer in communication. Thereby, it is possible to maintain the communication quality of the communication connection of the mobile station 40 while avoiding the interference of the mobile station 40 for the communication connection of the mobile station 30.

In addition, in the embodiment, it is detected that the communication connection through the femtocell base station 20 (communication connection unit 23) is entirely disconnected, and then the power of the transmission signal is suppressed. Therefore, it is possible to prevent the femtocell base station 20 from being in the sleep state while the femtocell base station 20 and the mobile station are in communication with each other.

Further, in the embodiment, even when the femtocell base station 20 is in the sleep state, it is possible to acquire received power of the uplink signal received from the unregistered mobile station, and to release the sleep state of the femtocell base station 20 in accordance with the acquired received power. Thereby, when the influence of the interference is reduced, the femtocell base station 20 can be set to the active state rapidly.

Further, in the embodiment, as the received power of the downlink circuit signal received from the macro base station 10 becomes larger, the value of the threshold $A_1$ is made smaller. Therefore, when the macro base station 10 and the femtocell base station 20 exists at a short distance, the handover from the femtocell base station 20 to the macro base station 10 easily occurs.

As described above, although the embodiment of the invention has been set forth with reference to the drawings, it is merely illustrative of the invention, and various configurations other than those stated above can be adopted.

The wireless communication system which is an application field of the invention is particularly not limited. For example, the invention can also be applied to a wireless communication system (for example, IEEE 802.16m) in which a time division duplex (TDD) system that temporally divides the same wireless frequency in the uplink and the downlink is adopted. In addition, the invention can also be applied to, for example, a wireless communication system of a W-CDMA system, an E-UTRA system or WiMAX.

In the above-mentioned embodiment, the number of the macro base stations 10 adjacent to the femtocell base station 20 is set to one, but may be set to a plural number. In addition, in the above-mentioned embodiment, the registered mobile station and the unregistered mobile station are set to one mobile station 30 and one mobile station 40, respectively, but may be set to a plural number, respectively.

A portion of the process of the femtocell base station 20 in the above-mentioned embodiment, for example, the process of the handover execution unit 25 or the transmission power control unit 26 may be executed by a device disposed above the femtocell base station 20, for example, a radio network controller (RNC).

In the above-mentioned embodiment, the description has been made of the purport of allowing the communication connection to the femtocell base station 20 depending on whether the mobile station is a "registered mobile station". However, the femtocell base station 20 may allow the communication connection even when the mobile station is not a "registered mobile station". For example, the communication connection of unregistered mobile stations may be allowed in the range of the upper-limit number previously determined. In this case, the unregistered mobile station of which the communication connection is allowed may be handled similarly to the registered mobile station, or the communication regulation that limits the communication contents of the unregistered mobile station as compared to the registered mobile station is performed and then the communication connection thereof may be made. An example of the limitation of the communication contents is to suppress the communication speed of the unregistered mobile station slower than that of the registered mobile station.

In the above-mentioned embodiment, although two kinds of setting values corresponding to the active state and the sleep state have been used in the setting value of the transmission power set by the transmission power control unit 26, the setting value can be set to three or more multi-stages.

The above-mentioned embodiment, a case in which the invention is applied to the femtocell base station has been described. However, the invention is not limited to the femtocell base station, and can be applied to a pico base station and a micro base station that cover a broader area than that of the femtocell base station. In addition, the invention can also be applied to each of a plurality of wireless stations in which a wireless ad hoc network is autonomously formed.

In the above-mentioned embodiment, the communication quality acquired by the communication quality acquisition unit 24 uses the received power of the uplink signal received from the mobile station 40 which is not a registered mobile station, but may not be limited thereto. For example, the communication quality acquisition unit 24 may acquire an interference wave value, as a communication quality, which is indicative of a larger value as the influence of the interference wave for the received signal received from the mobile station 30 (another mobile station) in communication is larger, and the handover execution unit 25 may hand over the communication connection of the mobile station 30 to the macro base station 10 when the interference wave value acquired by the communication quality acquisition unit 24 exceeds the threshold $A_3$. Meanwhile, the threshold $A_3$ may be a value equal to any of the threshold $A_1$ or the threshold $A_2$, and may be a value different from the both of them.

As the above-mentioned interference wave value, values used in a wireless standard (SIR: Signal to Interference Ratio, SINR: Signal to Interference and Noise Ratio, CIR: Carrier to Interference Ratio, Eb/No: Energy per bit over Noise, and the like) may be used.

In the above-mentioned embodiment, it has been explained that the received power of the received signal received from the macro base station 10 is acquired, and the threshold $A_1$ is changed based thereon. The same effect is obtained even when distance information indicative of the distance between the macro base station 10 and the femtocell base station 20 is used instead of the received power of the received signal received from the macro base station 10. That is, the femtocell base station 20 acquires distance information indicative of the distance between the macro base station 10 and the femtocell base station 20, and the threshold $A_1$ may be made smaller as the distance indicated by the acquired distance information is shorter.

In addition, in the description of the above-mentioned embodiment, although a plurality of flow diagrams is used, and a plurality of steps is mentioned in each of the flow diagrams in order, the order mentioned above is not limited to the order of executing the steps of the wireless communication method according to the invention. For this reason, when the wireless communication method according to the invention is executed, the order of a plurality of steps can be changed in the range without any problems for the contents.

Meanwhile, the embodiment and a plurality of modified examples mentioned above can be naturally combined in the range consistent with the contents thereof. In addition, in the embodiment and modified examples mentioned above, although the structure and the like of each part have been specifically described, it is possible to variously change the structure and the like in the range that satisfies the invention.

Priority is claimed on Japanese Patent Application No. 2009-194213, filed on Aug. 25, 2009, the content of which is incorporated herein by reference.

The invention claimed is:

1. A wireless communication system comprising:
a first mobile station;
a second mobile station;
a first base station capable of being communicatively connected to the first mobile station and the second mobile station; and
a second base station capable of being communicatively connected to a registered mobile station,
wherein the second base station includes
a communication quality acquisition unit configured to acquire a quality of at least a received signal received from the second mobile station which is not the registered mobile station,
a handover execution unit configured to hand over a communication connection of the first mobile station which is the registered mobile station to the first base station, when the quality of the received signal received from the second mobile station, which is not the registered mobile station, satisfies a first predetermined condition, and the second base station is communicatively connected to the first mobile station, and
a transmission power control unit configured to suppress power of a transmission signal when the second base station satisfies a second predetermined condition,
wherein the communication quality acquisition unit is configured to acquire received power of the received signal received from the second mobile station as a communication quality, and the first predetermined condition is when the received power acquired through the communication quality acquisition unit exceeds a first threshold.

2. The wireless communication system according to claim 1, wherein the second predetermined condition is that a communication connection to the first mobile station is entirely disconnected.

3. The wireless communication system according to claim 1, wherein when the power of the transmission signal is suppressed, the communication quality acquisition unit is configured to acquire received power of another received signal received from the second mobile station which is not the registered mobile station, and
when the received power of the other received signal is less than or equal to a second threshold, the transmission power control unit is configured to release suppression of power for the transmission signal.

4. The wireless communication system according to claim 3, wherein the second threshold is smaller than the first threshold.

5. The wireless communication system according to claim 1, wherein the second base station further includes a received power acquisition unit configured to acquire received power of a received signal received from the first base station, and
the transmission power control unit is configured to make the first threshold smaller as the received power becomes larger.

6. The wireless communication system according to claim 1, wherein the second base station includes a distance information acquisition unit configured to acquire distance information indicative of a distance between the first base station and the second base station, and
the transmission power control unit is configured to make the first threshold smaller as the distance indicated by the distance information is shorter.

7. The wireless communication system according to claim 1, wherein the communication quality acquisition unit is configured to acquire an interference wave value, indicative of a larger value as the influence of an interference wave for the received signal received from the second mobile station is larger, as the communication quality, and
when the interference wave value exceeds a third threshold, the handover execution unit is configured to hand over the communication connection of the first mobile station to the first base station.

8. The wireless communication system according to claim 1, further comprising:
a mobile station information acquisition unit configured to acquire mobile station information, specifying one mobile station, from a received signal received from the one mobile station.

9. The wireless communication system according to claim 8, wherein the communication quality acquisition unit is configured to acquire a communication quality of at least a received signal received from second mobile station when the specified mobile station is the second mobile station.

10. A base station comprising:
a communication connection unit configured to communicatively connect to a first mobile station which is a registered mobile station;

a communication quality acquisition unit configured to acquire a quality of at least one of a received signal received from the first mobile station and a received signal received from a second mobile station which is not the registered mobile station;

a handover execution unit configured to hand over a communication connection of the first mobile station to another base station different from its own base station when the communication quality of the received signal received from the second mobile station, which is not the registered mobile station, satisfies a predetermined condition; and a transmission power control unit that suppresses power of a transmission signal when the communication connection unit is not communicatively connected to the first mobile station, wherein the communication quality acquisition unit is configured to acquire received power of the received signal received from the second mobile station as a communication quality, and the first predetermined condition is when the received power acquired through the communication quality acquisition unit exceeds a first threshold.

11. A wireless communication method comprising:
performing a communication connection to a first mobile station which is a registered mobile station;
acquiring a communication quality of at least one of a received signal received from the first mobile station and a received signal received from a second mobile station which is not the registered mobile station;
handing over a communication connection of the first mobile station when the communication quality of the received signal received from the second mobile station, which is not the registered mobile station, satisfies a predetermined condition; and
suppressing power of a transmission signal when the communication connection to the first mobile station is not made,
wherein the wireless communication method further comprises:
  acquiring received power of the received signal received from the second mobile station as the communication quality, and
  handing over the communication connection of the first mobile station to the first base station when the received power exceeds a first threshold.

12. The wireless communication method according to claim 11, further comprising:
suppressing the power of the transmission signal after it is detected that a communication connection to the first mobile station is entirely disconnected.

13. The wireless communication method according to claim 12, further comprising:
acquiring an interference wave value indicative of a larger value as the influence of an interference wave for a received signal received from the another mobile station is larger is acquired as the communication quality, and
in the handover execution step, handing over the communication connection of the first mobile station when the interference wave value exceeds a third threshold.

14. The wireless communication method according to claim 11, further comprising:
acquiring received power of another signal received from the second mobile station, when the power of the transmission signal is suppressed and
releasing suppression of the power for the transmission signal when the received power of the other signal is less than or equal to a second threshold.

15. The wireless communication method according to claim 14, wherein the second threshold is smaller than the first threshold.

16. The wireless communication method according to claim 11, further comprising:
acquiring received power of a received signal received from the first base station, making the first threshold smaller as the received power becomes larger.

17. The wireless communication method according to claim 11, further comprising:
acquiring distance information indicative of a distance between the first base station and the second base station,
making the first threshold smaller as the distance indicated by the distance information is shorter.

18. A non-transitory computer readable recording medium having a program stored thereon, the program causing a computer to execute data processing,
wherein the data processing comprises:
acquiring a communication quality of at least a received signal received from a second mobile station which is not a registered mobile station;
handing over a communication connection of a first mobile station, when the communication quality of the received signal received from the second mobile station, which is not the registered mobile station, satisfies a predetermined condition, and a communication connection to the first mobile station is made; and
suppressing power of a transmission signal when the communication connection to the first mobile station is not made,
wherein the data processing further comprises:
acquiring received power of the received signal received from the second mobile station as the communication quality, and
handing over the communication connection of the first mobile station to the first base station when the received power exceeds a first threshold.

* * * * *